United States Patent
Chen et al.

(10) Patent No.: US 6,456,427 B1
(45) Date of Patent: Sep. 24, 2002

(54) SYSTEMS AND METHODS FOR REDUCING A SIGNAL SPECTRUM TILT

(75) Inventors: Yijiang Chen, Chelmsford; John L. Zyskind, Concord, both of MA (US); Graeme J. Pendock, Merrimack, NH (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/754,832

(22) Filed: Jan. 3, 2001

(51) Int. Cl.[7] .......................... H04B 10/12; H04B 10/08
(52) U.S. Cl. ..................................... 359/337.1; 359/110
(58) Field of Search ............................ 359/337.1, 337, 359/341.41, 341.42, 341.4

(56) References Cited

U.S. PATENT DOCUMENTS

| | | | | |
|---|---|---|---|---|
| 5,530,583 A | * | 6/1996 | Uno | 359/341 |
| 5,847,862 A | * | 12/1998 | Charplyvy | 359/337 |
| 6,088,152 A | * | 7/2000 | Berger | 359/334 |
| 6,104,528 A | | 8/2000 | Hwang | 359/341 |
| 6,212,001 B1 | * | 4/2001 | Bode | 359/341 |
| 6,275,313 B1 | * | 8/2001 | Denkin | 359/124 |
| 6,304,370 B1 | * | 10/2001 | Barnard | 359/341.1 |
| 6,323,993 B1 | * | 11/2001 | Hansen | 359/337 |

OTHER PUBLICATIONS

Zirngibl, M. "Analytical model o fRaman effects in massive wavelength division multiplexed transmission systems." Elect. Lett. 34:Apr. 8, 1998. pp. 789–790.*

Chraplyvy, A.R. and Tkach, R.W. "What is the Actual Capacity of Single–Mode Fibers in Amplified Lightwave Systems?" IEEE Photonics Tech. Lett. 5:6, Jun. 1993. pp. 666–668.*

Agrawal, G.P. "Fiber–Optic Communication Systems, $2^{nd}$ Ed." John Wiley & Sons, New York, 1997. pp. 60–62; 323–325.*

Willner, A.E. and Hwang, S.–M. "Transmission of many WDM Channels Through a Cascade of EDFA's in Long–Distance Links and Ring Networks." J. Lightwave Tech. 13:May 5, 1995. pp. 802–816.*

Zou, X.Y. et al. "Compensation of Raman Scattering and EDFA's Non–Uniform Gain in Ultra–Long–Distance WDM Links." IEEE Photonics Tech. Lett. 8:Jan. 1, 1996. pp. 139–141.*

Forghieri, Fabrizio et al., "Effect of Modulation Statistics on Raman Crosstalk in WDM Systems." *IEEE Photonics Technology Letters*, (1995), vol. 7, pp. 101–103.

Shaulov, Gary et al., "Measurment of Raman Coefficient for Small Wavelength Shifts." OFC 2000 Proceedings, Paper Tua4–1–TuA4–3, Mar. 7–10, 2000; Baltimore, Maryland.

* cited by examiner

*Primary Examiner*—Thomas H. Tarcza
*Assistant Examiner*—Andrew R. Sommer
(74) *Attorney, Agent, or Firm*—Lahive & Cockfield, LLP

(57) ABSTRACT

Methods and systems for reducing a first tilt of a spectrum of light transmitted via an optical fiber are provided. To reduce the first tilt, an amplifier, such as an erbium doped fiber amplifier, is configured to yield a gain spectrum with an opposite tilt to that of the first tilt. When light traverses the fiber by passing the amplifier, the first tilt of the spectrum and the opposite tilt of the gain spectrum cancel partially or totally, thereby reducing the first tilt.

4 Claims, 8 Drawing Sheets

SYSTEMS AND METHODS FOR REDUCING A SIGNAL SPECTRUM TILT

TECHNICAL FIELD

The present invention relates generally to data transmission via optical fibers, and specifically relates to reducing a tilt of a spectrum of light transmitted via an optical fiber.

BACKGROUND OF THE INVENTION

The use of optical fibers to transmit voice, television, and computer data is becoming more widespread because of the advantages optical fibers provide over other data transmission technologies. Optical fibers transmit data at the speed of light, offer large bandwidths, and are less susceptible to external noise than other transmission media. It is also difficult to tamper with optical fibers by monitoring or injecting data in the middle of a connection; hence, optical fibers are appropriate for secure communications.

To increase the effectiveness of data transmission, multiple wavelengths of light may be transmitted along the same optic fiber. These wavelengths are combined by a wavelength division multiplexer and sent as a single transmitted signal. At the destination, the transmitted signal may then be separated into its component wavelengths or "channels" by a wavelength division demultiplexer.

Systems employing wavelength division multiplexers, however, are subject to a problem known as signal spectrum tilt. This tilt of the signal spectrum arises because of stimulated Raman scattering between photons being transmitted in the optical fiber and particles in the fiber. Due to the wavelength dependence of stimulated Raman scattering, system power is transferred from the lower wavelength channels to higher wavelength channels. This transfer of power results in a tilt, T, given by $$T = \begin{cases} s_{max} - s_{min} & \text{if } \lambda_{max} - \lambda_{min} > 0 \\ s_{min} - s_{max} & \text{if } \lambda_{max} - \lambda_{min} \leq 0 \end{cases}$$

where the maximum, $s_{max}$, and the minimum, $s_{min}$, of the power spectrum occurs at a wavelength of $\lambda_{max}$ and $\lambda_{min}$, respectively. In general, a tilt of a spectrum can be a positive number, in which case the sign of the tilt is positive, or a negative number, in which case the sign of the tilt is negative.

A power spectrum 10 with a positive tilt is shown in FIG. 1. Such a tilt may arise because of stimulated Raman scattering between photons and particles in the fiber. Also shown for comparison is a baseline 18 that corresponds to a power spectrum with no tilt. The positive tilt shown in FIG. 1 arises because power is transferred to the higher wavelengths at the expense of power in the lower wavelengths. Such a tilt implies that power is not transmitted uniformly across various channels. The non-uniformity of power distribution results in inefficient data transmission. For example, a receiver of a signal transmitted via the fiber may be configured to process data that uniformly occupies a certain set of channels. If the channels are not so occupied, ineffective data processing may occur.

SUMMARY OF THE INVENTION

For the foregoing reasons, there exists in the art a need for systems and methods for reducing a signal spectrum tilt in data transmission via optical fibers. For many applications, the ideal spectrum is one having zero tilt where power is distributed equally among all the channels.

The objective of reducing a first tilt of a power spectrum of light arising from scattering by an optical fiber can be achieved according to the present invention by adjusting a gain spectrum of an amplifier in the fiber transmission system. An amplifier is coupled to the fiber, and is configured to produce a gain spectrum with a second tilt that has a sign opposite to that of the first tilt. The first tilt, arising from scattering in the fiber, and the second tilt of opposite sign, arising from the configured amplifier, cancel to yield a power spectrum with a reduced tilt.

In particular, a method of reducing a tilt of a spectrum of light transmitted via an optical fiber is presented herein including transmitting a light signal over the optical fiber to a receiver, wherein a power spectrum of the light signal at the receiver has a tilt because of scattering. The method also includes configuring the amplifier in the transmission system to compensate for the tilt and thereby reduce the tilt of the power spectrum of the light signal.

A method for reducing a tilt of a spectrum of light transmitted via an optical fiber is also presented below that includes providing a source of light, such as a laser, and connecting the source to a receiver of light via an optical fiber. The light populating a set of channels that is sent from the source to the receiver via the fiber has a first power spectrum at the receiver having a first tilt with a first sign. In addition, the method includes connecting at least one of the source, receiver, and fiber with an amplifier that is configured to produce a gain spectrum with a second tilt that has a second sign that is opposite to the first sign. The choice of second tilt depends on the set of channels, such as, for example the number of channels in the set. The method also includes allowing a packet of light, populating the set of channels and travelling from the source to the receiver, to pass the amplifier. This results in a second power spectrum of the packet of light at the receiver that has a residual tilt whose magnitude is smaller than a magnitude of the first tilt.

In the method, if the set of channels corresponds to a full C- band and a full L-band, then the amplifier is configured to produce a gain spectrum with a second tilt lying in the interval (−1.1T, −0.9T) where T is the first tilt. If, on the other hand, the set of channels corresponds to a random population in a C-band and an L-band, then the amplifier is configured to yield a gain spectrum in the C-band with a tilt lying in the interval (−0.83T, −0.63T), and a gain spectrum in the L band with a tilt lying in the interval (−1.1T, −0.9T), where T is the first tilt.

A method is also presented below for reducing a tilt of a spectrum of light transmitted via an optical fiber. The method includes sending a first packet of light from a source to a receiver via the optical fiber, and, at the receiver, measuring a spectrum of the light, the spectrum having a first tilt with a first sign. The method further includes configuring an amplifier for producing a gain spectrum with a second tilt that has a second sign that is opposite to the first sign, and coupling the amplifier to the optical fiber. The method also includes allowing a second packet of light to travel from the source to the receiver by passing the amplifier, wherein a second power spectrum of the second packet of light at the receiver has a residual tilt whose magnitude is smaller than a magnitude of the first tilt.

Also presented below is an apparatus for reducing a tilt of a spectrum of light transmitted via an optical fiber. The apparatus includes a source of light and an optical fiber. The fiber is capable of receiving light at a first end of the fiber, and emitting scattered light at a second end of the fiber, the scattered light having a first spectrum with a first tilt characterized by a first sign. The apparatus further includes a connector for connecting the source of light to the first end of the fiber, and an amplifier configured to produce a gain spectrum that has a second tilt characterized by a second sign that is opposite to the first sign. The amplifier is coupled to the optical fiber so that light propagating from the first end to the second end passes therethrough. The light reaching the second end has a second spectrum with a residual tilt whose magnitude is smaller than a magnitude of the first tilt.

BRIEF DESCRIPTION OF THE DRAWINGS

The aforementioned features and advantages, and other features and aspects of the present invention, will become better understood with regard to the following description and accompanying drawings.

DETAILED DESCRIPTION OF THE INVENTION

Raman scattering may lead to a tilt in a spectrum of light transmitted via an optical fiber. In many applications, it is desirable to reduce this tilt for effective data transmission and processing. According to the teachings of the present invention, to reduce the tilt, an amplifier may be used to compensate for the tilt.

Figure 2A:
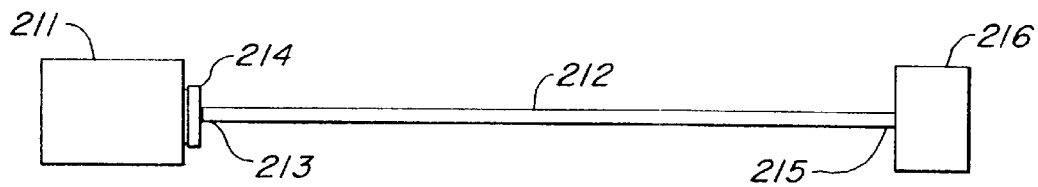
FIG. 2A shows an apparatus for conveying a signal via an optical fiber.
Figure 2B:
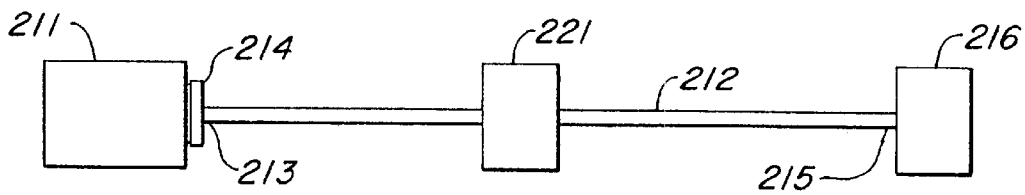
FIG. 2B shows an apparatus for reducing a tilt of a spectrum of light transmitted via an optical fiber, according to the teachings of the present invention.
Figure 2C:
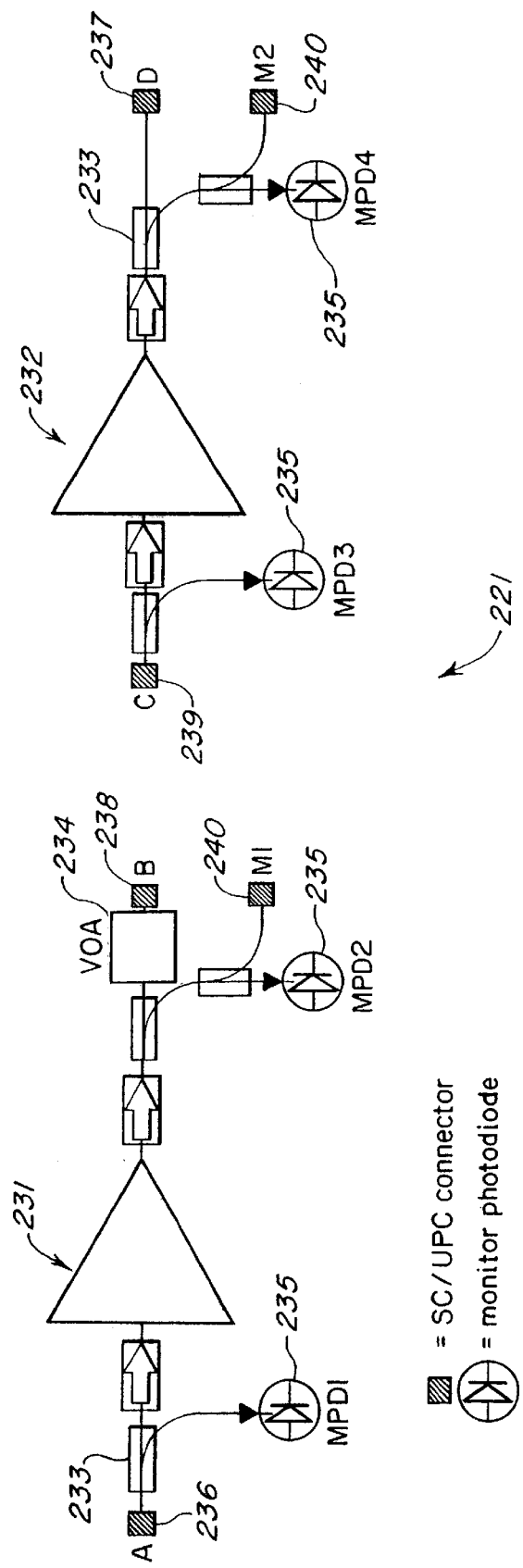
FIG. 2C shows an amplifier that may be used for reducing a tilt of a spectrum of light, according to the teachings of the present invention.

Referring to FIGS. 2A–C, an apparatus for reducing a tilt of a spectrum of light transmitted via an optical fiber is shown. In FIG. 2A, a source of light 211 is connected to a first end 214 of an optical fiber 212 by a connector 213. In one embodiment of the present invention, the source of light 211 is a laser emitting light that occupies a set of channels, such as the C-band or L-band. The optical fiber 211 can include fibers known to those of ordinary skill in the art for propagating light, such as a Single Mode Fiber (SMF), a LEAF™, or True Wave™ (TW) fiber. A second end 215 of the optical fiber 212 is connected to a receiver 216. The receiver 216, for example, may include a processor for analyzing data transmitted via the fiber 212, or an end-of-fiber switch.

Figure 1:
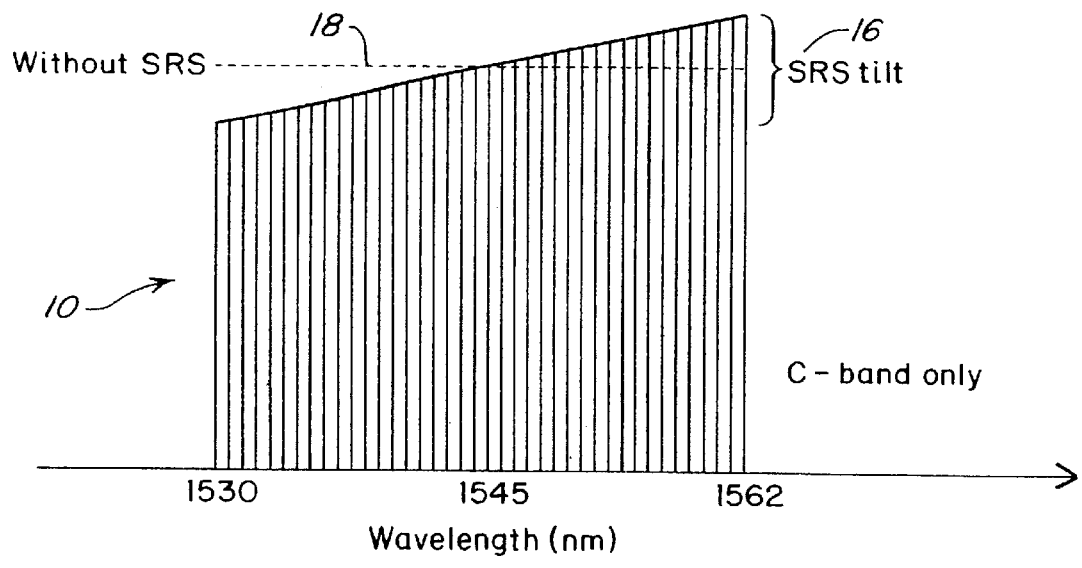
FIG. 1 is a schematic of a power spectrum with a positive tilt.

As light is propagated along the optical fiber 212 from the source 211, the light is susceptible to scattering, such as stimulated Raman scattering, from particles present in the fiber 212. Stimulated Raman scattering may cause power to increase at longer wavelengths at the expense of shorter wavelengths. As a consequence, a power spectrum of the scattered light at the second end 215 may have a first tilt characterized by a first sign, which is typically positive, such as the tilt appearing in FIG. 1.

Referring now to FIG. 2B, an amplifier 221 is shown connected to the optical fiber 212. In other embodiments, the amplifier 221 may be coupled to the fiber 212 by connecting the amplifier 221 to the source of light 211 or to the receiver 216. The amplifier 221 may be an erbium doped fiber amplifier known to those of ordinary skill in the art. Light propagating from the first end 213 to the second end 215 passes the amplifier 221.

The amplifier 221 is configured to produce a gain spectrum that has a second tilt characterized by a second sign that is opposite to the first sign. For example, if the first tilt is a positive number, the second tilt of the gain spectrum is a negative number. Thus, if light with a light spectrum having a zero tilt were input in the configured amplifier 221, the output light coming out of the amplifier 221 would have a spectrum with a negative second tilt.

Referring to FIG. 2C, an example of an amplifier 221 that may be used in one embodiment of the present invention is an erbium-doped amplifier 231. The erbium doped amplifier in FIG. 2C includes a first stage amplifier 231 and a second stage amplifier 232. The amplifiers 231–232 both have a coupler 233 and a monitor photodiode 235. The first stage amplifier 231 has a variable optical attenuator 234 to vary a tilt in the gain spectrum. An input 236 to the amplifier and an output 237 can connect to the optical fiber 212. A middle stage access input 238 and output 239 permit the two stage amplifiers 231 and 232 to be connected to each other directly or indirectly via a dispersion compensation fiber (not shown).) External monitor ports 240 are used to monitor amplifier performance externally.

Figure 3:
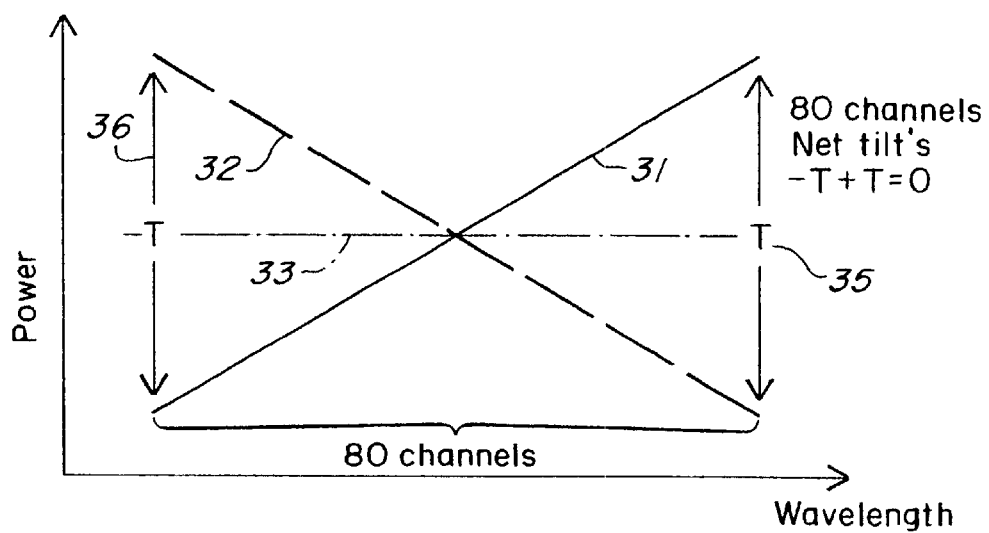
FIG. 3 shows a spectrum having a tilt characterized by a sign, and a gain spectrum characterized by an opposite sign, according to the teachings of the present invention.

Referring to FIG. 3, a spectrum 31, shown with a solid line, is illustrated having a tilt 35 equal to T. Light from the source 211 populating only the full complement of 80 channels in the C-band propagates along the fiber 212 and exits the second end 215 of FIG. 2A as scattered light that produces the spectrum 31 with tilt T. Also shown in FIG. 3 is a gain spectrum 32, shown with a dashed line, having a tilt 36 equal to −T. The amplifier 221 may be configured to produce such a gain spectrum 32 by adjusting the variable optical attenuator 234. An amplifier so configured is capable of accepting light with a spectrum corresponding to only a full C-band with zero tilt, and outputting light with a gain spectrum 32 having a second tilt equal to −T. Such an amplifier is said to be configured for 100% compensation in the C-band. According to the teachings of the present invention, by using an amplifier configured for 100% compensation in the C-band, the spectra 31–32 cancel to produce a net spectrum 33 at the second end 215 in FIG. 2B of zero tilt. A spectrum with zero tilt corresponds to equal power distribution across the C-band, which is ideal in many applications.

Figure 4:
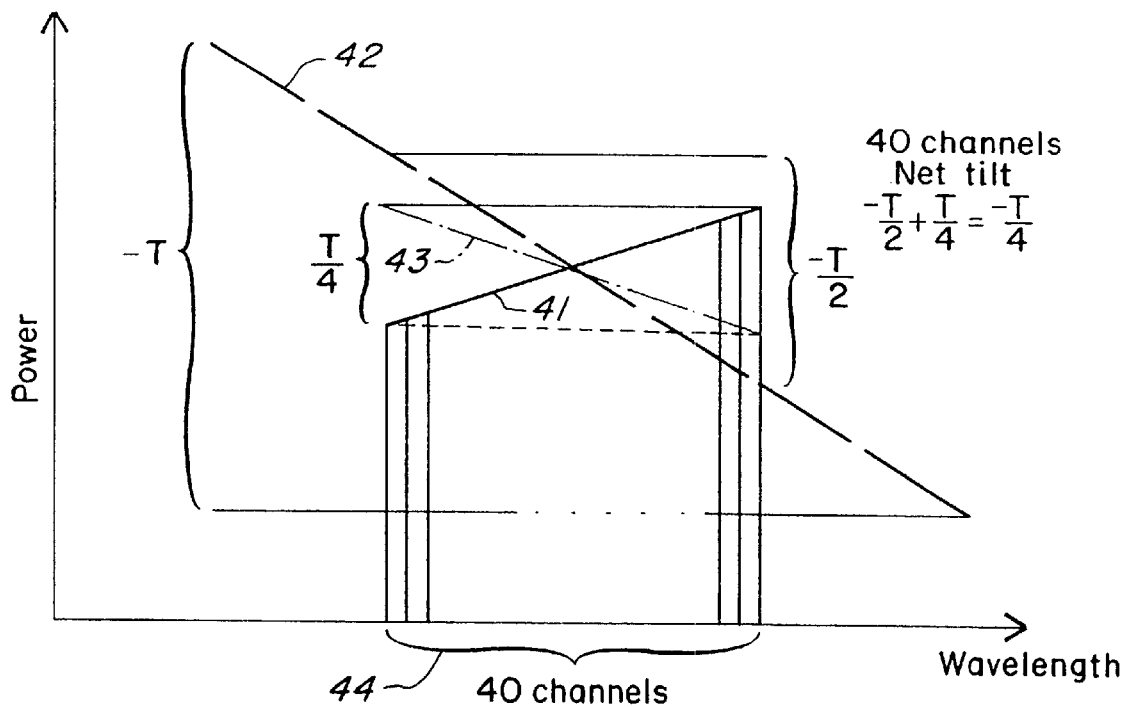
FIG. 4 shows a spectrum having a tilt characterized by a sign, and a gain spectrum characterized by an opposite sign, according to the teachings of the present invention.

Utilizing an amplifier configured for 100% compensation in the C-band yields a residual tilt, or penalty, if light from the source 211 populates only a fraction of the C-band. A spectrum 43 with such a residual tilt is shown in FIG. 4. As known to those of ordinary skill in the art, the tilt of a spectrum of light caused by stimulated Raman scattering is proportional to the square of the number of channels. Therefore, if the source 211 of FIG. 2A emits light populating half a C-band having only forty channels 44, the corresponding spectrum 41 produced at the second end 215 has a tilt of T/4. Inputting half a populated C-band into an amplifier 221 with 100% compensation in the C-band yields a gain spectrum 42 with a tilt of −T/2. Disposing an amplifier 221 under such conditions between the first end 213 and the second end 215 results in a spectrum 43 at the second end 215 having a residual tilt of T/4−T/2=−T/4.

The residual tilt varies with the number of channels populated by the light from the source 211. To minimize the residual tilt, the band should be populated from the middle and spread towards either end of the band. A population of a few channels occupies a small portion of bandwidth. Therefore, even if the amplifier is configured for 100% compensation, the residual tilt is small.

Figure 5:
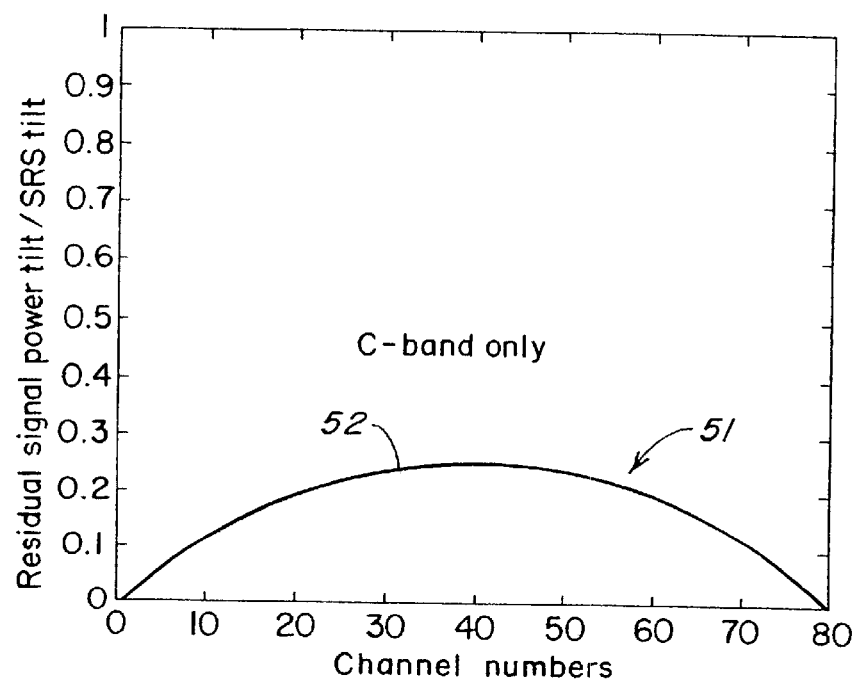
FIG. 5 shows a curve 51 corresponding to residual tilt/SRS tilt versus number of channels that may be used to configure an amplifier according to one embodiment of the present invention.

In FIG. 5, a curve 51 corresponding residual tilt/SRS tilt versus number of channels is plotted. The SRS tilt refers to the tilt of the spectrum of stimulated Raman scattered light from a source emitting a full band. For a full C-band, the SRS tilt is T. As the number of channels increases from zero, the residual tilt increases initially. This increase ends when the maximum 52 of T/4 is reached at forty channels (i.e., half the C-band). The curve 51 is then decreasing for T>T/4. The residual tilt becomes zero for full compensation when the C band is fully loaded.

When the source 211 emits light populating both the C and L-bands, the residual tilt may be minimized by first populating the middle channels of the C-band. After the C-band is full, the L-band may be populated from the blue end spreading to the red end. To balance SRS tilt, the amplifier 221 can be configured for compensation in both the C and L-bands in many ways.

Figure 6:
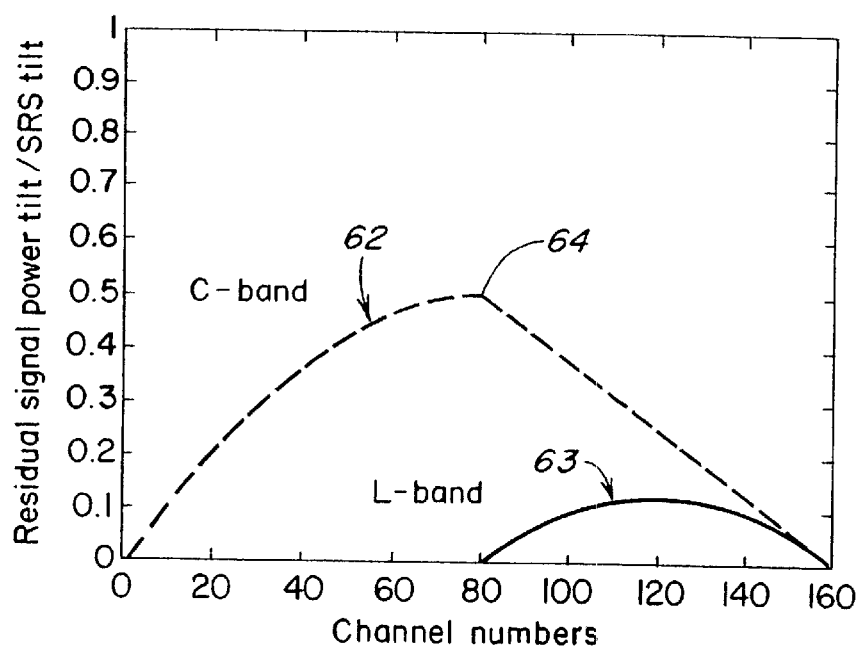
FIG. 6 shows a curve corresponding to residual tilt/SRS tilt versus number of channels when an amplifier is configured for 100% compensation in the both the C-band and the L-band.

Referring to FIG. 6, residual tilt/SRS tilt versus number of channels is plotted when the amplifier 221 is configured for 100% compensation in the both the C-band and the L-band. Curves 62 and 63 correspond to the residual tilt in the C-band and L-band, respectively. With only few channels populated, the residual tilt is small. The curve 62 reaches a maximum 64 (half of SRS tilt penalty), when 80 channels in the C-band are populated. The residual tilt becomes zero when all 160 waves are turned on.

Figure 7:
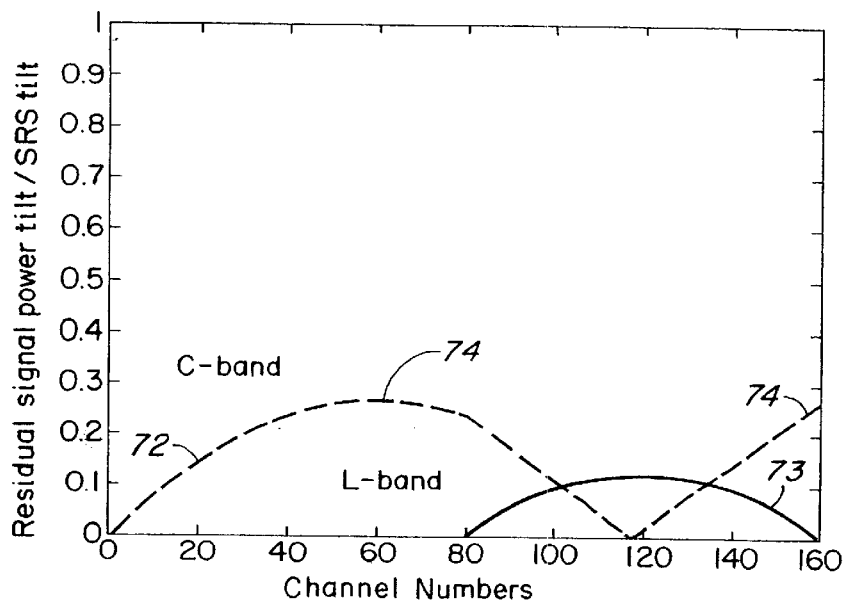
FIG. 7 shows a curve corresponding to residual tilt/SRS tilt versus number of channels when an amplifier is configured for 100% compensation in the both the L-band and 73% compensation in the C-band.

Another method of reducing the residual penalty is to configure the amplifier 221 for 73% compensation in the C-band (i.e., a configuration that results in a tilt of −0.73T in the gain spectrum when the input of the amplifier is a full C-band) and 100% compensation in the L-band. Referring to FIG. 7, residual tilt/SRS tilt versus number of channels is plotted when the amplifier 221 is configured in this manner. Curves 72 and 73 correspond to the residual tilt in the C-band and L-band, respectively. With only few channels populated, the residual tilt is small. The maxima 74 occur when 58 channels and 160 channels are populated. The maximum tilt is 26.7% of SRS tilt; in other words, the SRS tilt is reduced by approximately a factor of four by this configuration of the amplifier 221.

As the configuration of the amplifier 221 changes, so too does the maximum residual tilt. In the cases discussed above with reference to FIGS. 6–7, a compensation of 100% and 73% in the C-band (with a compensation of 100% in the L-band), results in a maximum residual tilt of 50% and 26.7%, respectively. (The latter maximum occurs at channel numbers 58 and 160).

Figure 8:
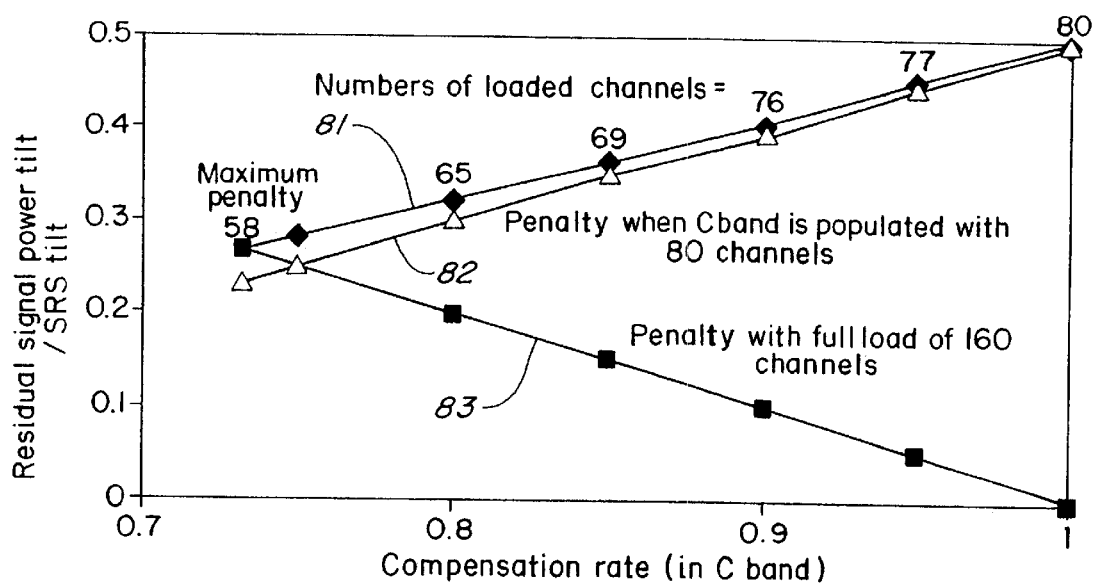
FIG. 8 shows a curve corresponding to the maximum residual tilt versus the compensation rate in the C-band.

The dependence of the maximum residual tilt on the compensation rate in the C-band (with 100% compensation in the L-band) is shown in FIG. 8 as curve 81. Also shown in FIG. 8 are a curve 82, the residual tilt/SRS tilt versus the compensation rate of the amplifier 221 when 80 channels are populated, and a curve 83, the residual tilt/SRS tilt versus the compensation rate in the amplifier when 160 channels are populated. Curves 81–83 help in determining the most effective configuration of the amplifier 221, according to principles of the present invention.

For instance, if the source 211 in FIG. 2B most frequently emits light that occupies 160 channels, the amplifier 211 can be configured for 100% compensation in he C-band. If, on the other hand, the source 211 most frequently emits light that is randomly populated in the C-band and L-band (i.e., the total number of channels occupied is equally likely to be any number between zero and 160, inclusive), then the amplifier can be configured for 73% compensation in the C-band for effective performance. In general, the optimal configuration of the amplifier 221 depends on the set of channels occupied by the light emitted from the source 211.

As mentioned above with reference to FIG. 1, the tilt in the power spectrum when only the C-band of 80 channels with −2 dBm/ch is populated is 0.54 dB for SMF, 0.6 dB for LEAF™, and 0.8 dB for TW™ fibers. When both C and L-bands are fully populated, with each band having 80 channels with −2 dBm/ch, the tilt in the C and L-bands increases to 1.08 dB for SMF, 1.2 dB for LEAF, and 1.7 dB for TW.

Figure 9:
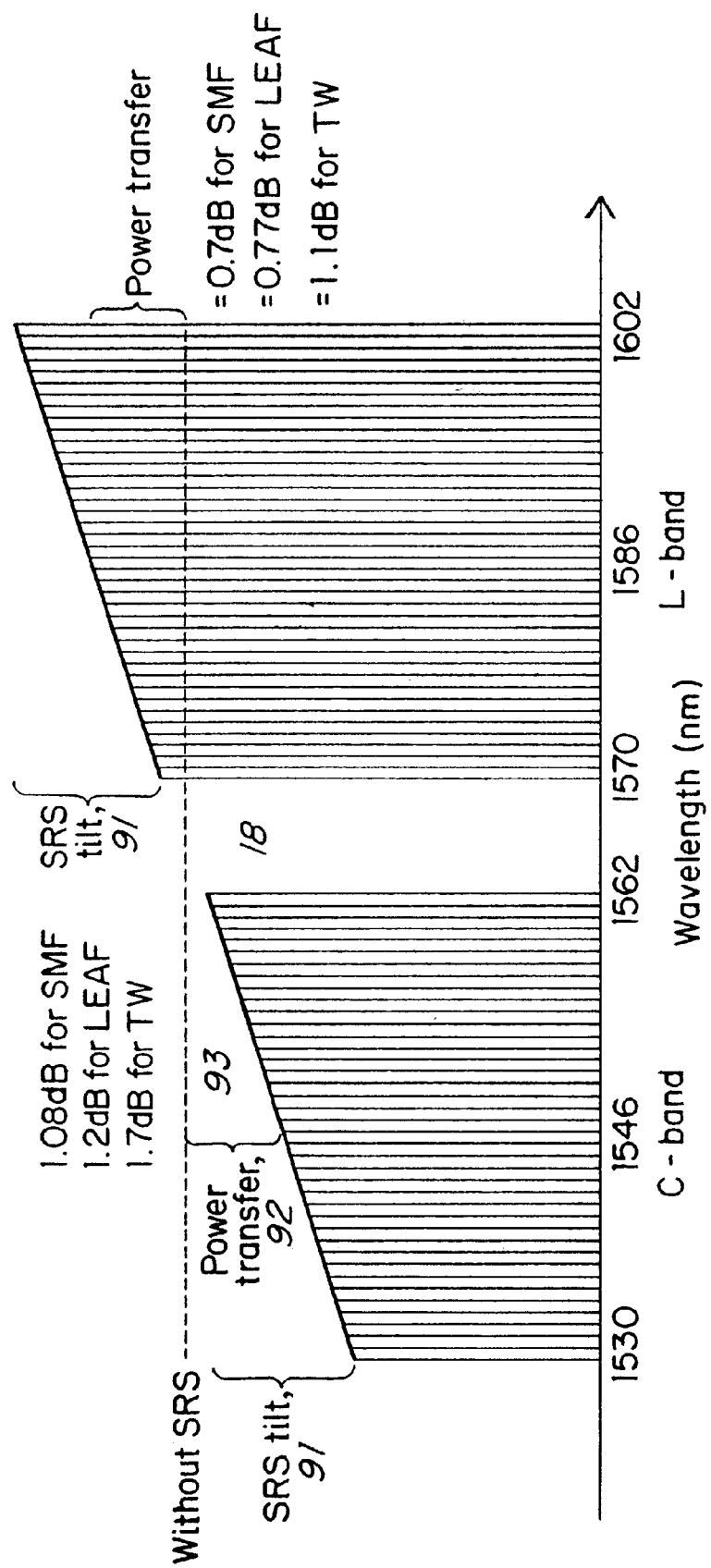
FIG. 9 illustrates a power transfer that occurs from the C-band to the L-band.

Referring to FIG. 9, in addition to the increase in the tilt 91 when both bands are populated, there is also a power transfer 92 that occurs from the C-band to the L-band by 0.7 dB for SMF, 0.77 dB for LEAF™, and 1.1 dB for TW™ fibers for a total of 160 channels in the C and L bands with power −2 bBm/ch. The power transfer refers to the amount that the curve 93 for the C-band translates downward from the baseline 18 corresponding to no tilt, with no power transfer. Such a power transfer may be taken into account by setting the gain of the amplifier in the C/L band higher/lower than the nominally required value. For example, with the above referenced case of SMF, the amplifier gain in the C/L band is designed to be 0.35 dB higher/lower than the nominally required value.

Figure 10:
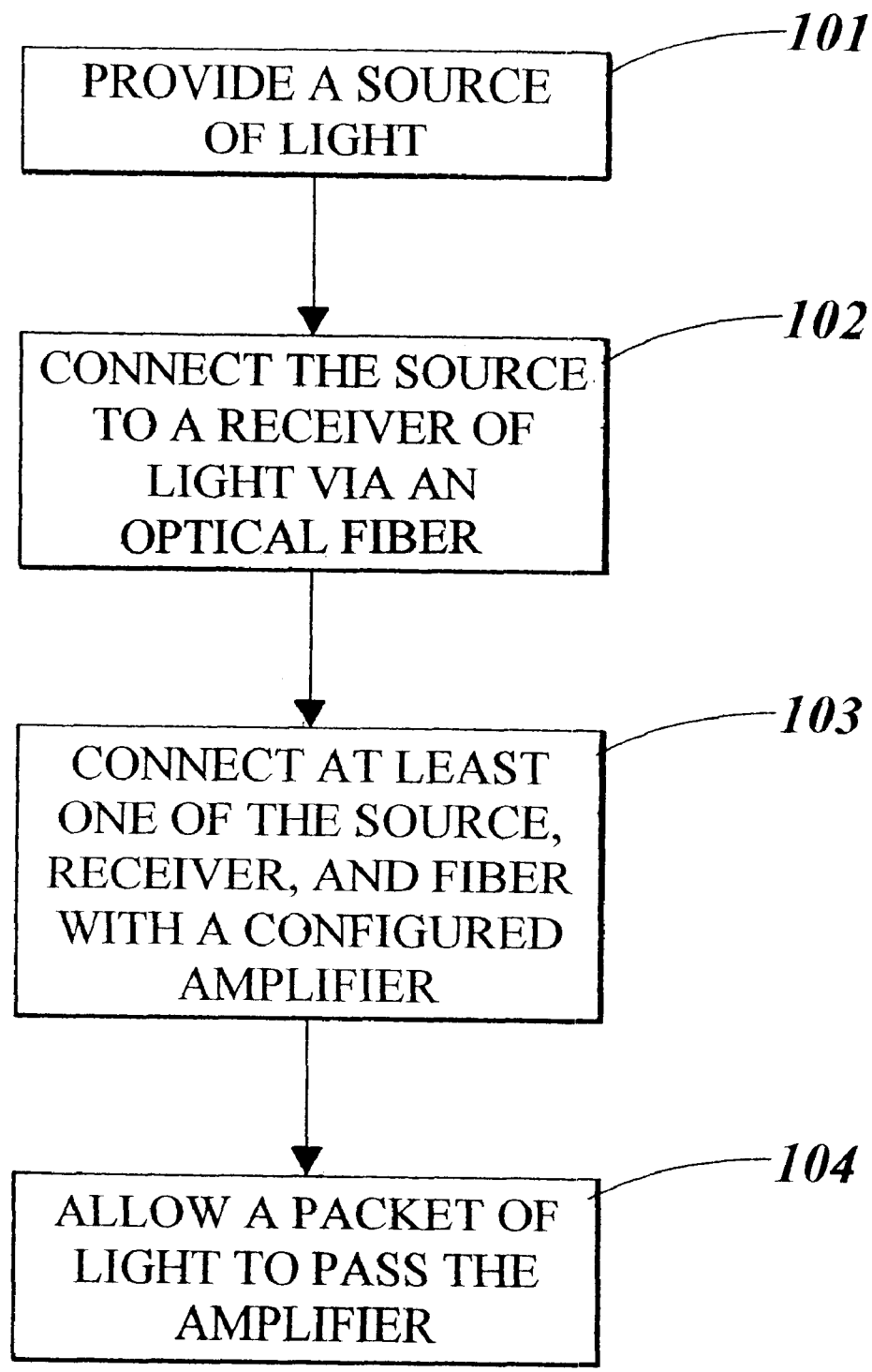
FIG. 10 shows a flow chart indicating steps for reducing a tilt of a spectrum of light transmitted via an optical fiber, according to one embodiment of the present invention.

Referring to FIG. 10, a flow chart is presented indicating steps for reducing a tilt of a spectrum of light transmitted via an optical fiber. In step 101, the source of light 211 is provided. For example, the source of light 211 can be a laser. In step 102, the source of light 211 is connected to a receiver 216 via the optical fiber 212. Light populating a set of channels that is sent from the source 211 to the receiver 216 via the fiber 212 has a first power spectrum at the receiver 216 having a first tilt with a first sign. For example, in FIG. 9, the sign of the tilt 91 is positive. Next, in step 103, at least one of the source 211, receiver 216, and fiber 212 is connected with the amplifier 221 that is configured to produce a gain spectrum with a second tilt that has a second sign that is opposite to the first sign. For example, in FIG. 3A, the sign of the tilt 36 of the gain spectrum is negative. Subsequently, in step 104, a packet of light, populating the set of channels and travelling from the source 211 to the receiver 216, is allowed to pass the amplifier 221. Because the first tilt and the second tilt cancel one another either completely or partially, a magnitude of a residual tilt of a second power spectrum of the packet of light at the receiver is smaller than a magnitude of the first tilt.

Figure 11:
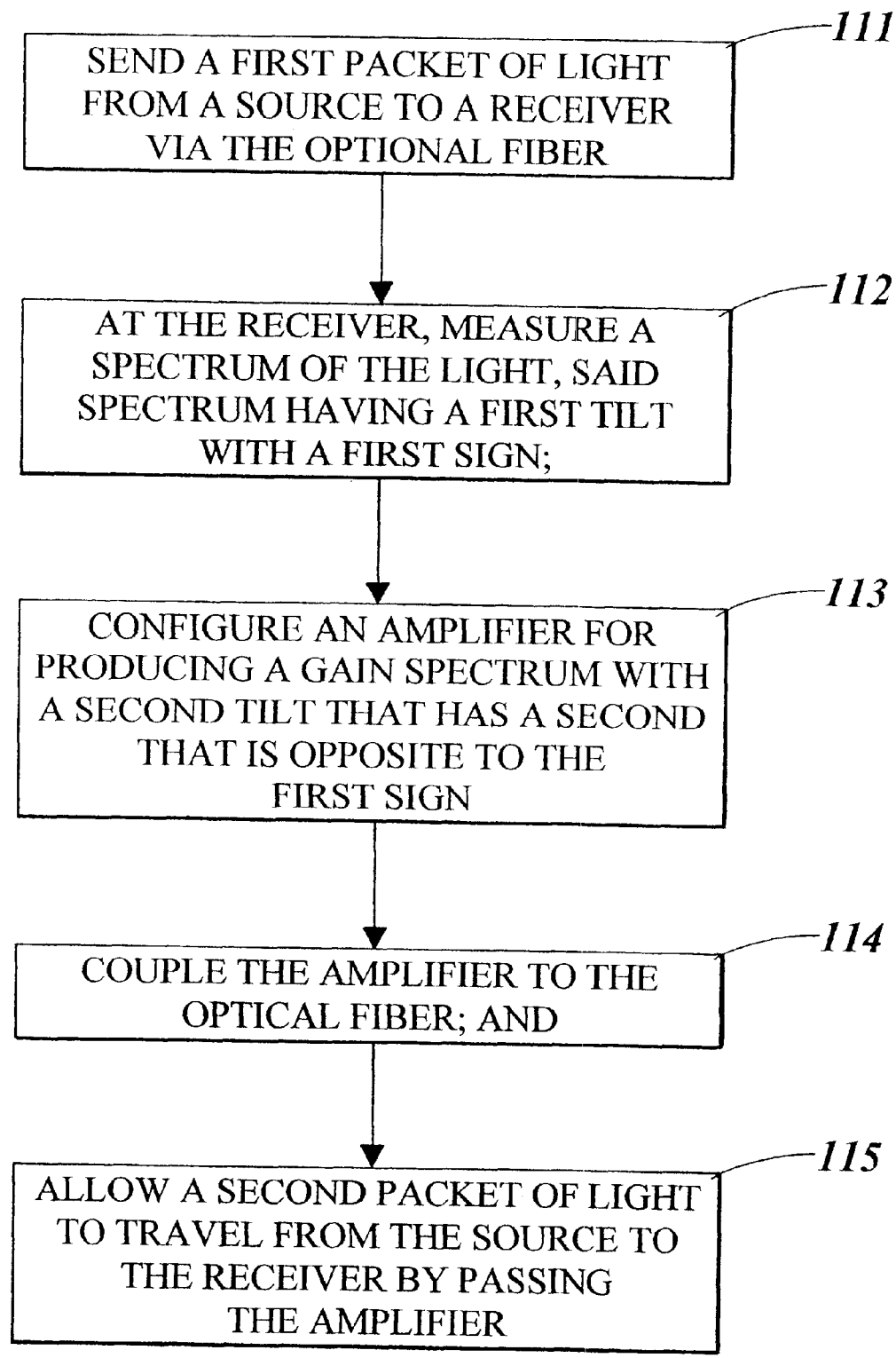
FIG. 11 shows a flow chart indicating steps for reducing a tilt of a spectrum of light transmitted via an optical fiber, according to one embodiment of the present invention.

Referring to FIG. 11, a flow chart is presented indicating steps for reducing a tilt of a spectrum of light transmitted via an optical fiber. In step 111, a first packet of light is sent from a source to a receiver via the optical fiber. In step 112, at the receiver, a spectrum of the light is measured, the spectrum having a first tilt with a first sign. In step 113, an amplifier is configured for producing a gain spectrum with a second tilt that has a second sign that is opposite to the first sign. In step 114, the amplifier is coupled to the optical fiber. Subsequently, in step 115, a second packet of light is allowed to travel from the source to the receiver by passing the amplifier. A second power spectrum of the second packet of light at the receiver consequently has a residual tilt whose magnitude is smaller than a magnitude of the first tilt.

While the present invention has been described with reference to illustrative embodiments thereof, those skilled in the art will appreciate that various changes in form and detail may be made without departing from the intended scope of the present invention as defined in the appended claims.

What is claimed:

1. A method for reducing a tilt of a spectrum of light transmitted via an optical fiber, the method comprising:
   a) providing a source of light;
   b) connecting the source to a receiver of light via an optical fiber, wherein light populating a set of channels in the C- band and the L-band that is sent from the source to the receiver via the fiber has a first power spectrum at the receiver having a first tilt with a first sign;
   c) connecting at least one of the source, receiver, and fiber with an amplifier that is configured to produce a gain spectrum with a second tilt that has a second sign that is opposite to the first sign; and
   d) allowing a packet of light, populating the set of channels and travelling from the source to the receiver, to pass the amplifier, resulting in a second power spectrum of the packet of light at the receiver that has a residual tilt whose magnitude is smaller than a magnitude of the first tilt.

2. A method for reducing a tilt of a spectrum of light transmitted via an optical fiber, the method comprising:
   a) providing a source of light;
   b) connecting the source to a receiver of light via an optical fiber, wherein light populating a set of channels corresponds to a random population in the C-band and the L-band that is sent from the source to the receiver via the fiber has a first power spectrum at the receiver having a first tilt with a first sign;
   c) connecting at least one of the source, receiver, and fiber with an amplifier that is configured to yield a gain spectrum with a second tilt that has a second sign that is opposite to the first sign in the C-band with the second tilt lying in the interval (−0.83T, −0.63T), and a gain spectrum in the L band with the second tilt lying in the interval (−1.1T, −0.9T), where T is the first tilt; and
   d) allowing a packet of light, populating the set of channels and travelling from the source to the receiver, to pass the amplifier, resulting in a second power spectrum of the packet of light at the receiver that has a residual tilt whose magnitude is smaller than a magnitude of the first tilt.

3. A method for reducing a tilt of a spectrum of light transmitted via an optical fiber, the method comprising:
   a) sending a first packet of light from a source to a receiver via the optical fiber;
   b) at the receiver, measuring a spectrum of the light, wherein the light populating a set of channels the C-band and the L-band, said spectrum having a first tilt with a first sign;
   c) configuring an amplifier for producing a gain spectrum with a second tilt that has a second sign that is opposite to the first sign;
   d) coupling the amplifier to the optical fiber; and
   e) allowing a second packet of light to travel from the source to the receiver by passing the amplifier, wherein a second power spectrum of the second packet of light at the receiver has a residual tilt whose magnitude is smaller than a magnitude of the first tilt.

4. A method for reducing a tilt of a spectrum of light transmitted via an optical fiber, the method comprising:
   a) sending a first packet of light from a source to a receiver via the optical fiber;
   b) at the receiver, measuring a spectrum of the light, wherein the light populating a set of channels corresponds to a random population in the C-band and the L-band, said spectrum having a first tilt with a first sign;
   c) configuring an amplifier for producing a gain spectrum in the C-band with the second tilt lying in the interval (−0.83T, −0.63T), and a gain spectrum in the L band with the second tilt lying in the interval (−1.1T, −0.9T), where T is the first tilt and the second tilt has a second sign that is opposite to the first sign;
   d) coupling the amplifier to the optical fiber; and
   e) allowing a second packet of light to travel from the source to the receiver by passing the amplifier, wherein a second power spectrum of the second packet of light at the receiver has a residual tilt whose magnitude is smaller than a magnitude of the first tilt.

* * * * *

UNITED STATES PATENT AND TRADEMARK OFFICE
CERTIFICATE OF CORRECTION

PATENT NO. : 6,456,427 B1
DATED : September 24, 2002
INVENTOR(S) : Chen et al.

It is certified that error appears in the above-identified patent and that said Letters Patent is hereby corrected as shown below:

Column 5,
Line 50, replace "in the both the c-band" with -- in both the c-band --;

Column 6,
Line 24, replace "in he c-band" with -- in the c-band --;
Line 46, replace "-2 bBm/ch." with -- -2 dBm/ch. --.

Column 7,
Lines 45-50, replace "allowing a packet of light, populating the set of channels and traveling from the source to the receiver, to pass the amplifier, resulting in a second power spectrum of the packet of light at the receiver that has a residual tilt whose magnitude is smaller than a magnitude of the first tilt." with -- sending a packet of light, which populates the set of channels and travels from the source to the receiver, so as to pass through the amplifier, causing a power transfer from the C-band channels to the L-band channels, resulting in a residual tilt whose magnitude is smaller than a magnitude of the first tilt. --

Column 8,
Lines 11-16, replace "allowing a packet of light, populating the set of channels and traveling from the source to the receiver, to pass the amplifier, resulting in a second power spectrum of the packet of light at the receiver that has a residual tilt whose magnitude is smaller than a magnitude of the first tilt." with -- sending a packet of light, which populates the set of channels and travels from the source to the reciever, so as to pass through the amplifier, causing a power transfer from the C-Band channels to the L-Band channels, resulting in a residual tilt whose magnitude is smaller than a magnitude to the first tilt. --

Lines 30-35, replace "allowing a second packet of light to travel from the source to the receiver by passing the amplifier, wherein a second power spectrum of the second packet of light at the receiver has a residual tilt whose magnitude is smaller than a magnitude of the first tilt." with -- sending a second packet of light, which travels from the source to the receiver by passing through the amplifier, causing a power transfer from the C-Band channels to the L-Band channels, wherein a second packet of light at the receiver has a residual tilt whose magnitude is smaller than a magnitude of the first tilt. --

UNITED STATES PATENT AND TRADEMARK OFFICE
CERTIFICATE OF CORRECTION

PATENT NO. : 6,456,427 B1
DATED : September 24, 2002
INVENTOR(S) : Chen et al.

It is certified that error appears in the above-identified patent and that said Letters Patent is hereby corrected as shown below:

Column 8 (cont'd),
Lines 51-55, replace "allowing a second packet of light to travel from the source to the receiver by passing the amplifier, wherein a second power spectrum of the second packet of light at the receiver has a residual tilt whose magnitude is smaller than a magnitude of the first tilt." with -- sending a second packet of light, which travels from the source to the receiver by passing through the amplifier, causing a power transfer from the C-Band channels to the L-Band channels, wherein a second packet of light at the receiver has a residual tilt whose magnitude is smaller than a magnitude of the first tilt. --

Signed and Sealed this

Twenty-eighth Day of December, 2004

JON W. DUDAS
*Director of the United States Patent and Trademark Office*